(12) United States Patent
Huang

(10) Patent No.: US 9,894,975 B2
(45) Date of Patent: Feb. 20, 2018

(54) LIGHT CURING DEVICE

(71) Applicant: QUAN MEI TECHNOLOGY CO., LTD., Kaohsiung (TW)

(72) Inventor: Kuo-Hsien Huang, Tainan (TW)

(73) Assignee: QUAN MEI TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 15/233,087

(22) Filed: Aug. 10, 2016

(65) Prior Publication Data

US 2017/0127789 A1    May 11, 2017

(30) Foreign Application Priority Data

Nov. 5, 2015 (TW) ............................. 104217716 U

(51) Int. Cl.
| | |
|---|---|
| A45D 29/00 | (2006.01) |
| H05B 37/02 | (2006.01) |
| F21V 8/00 | (2006.01) |
| H05B 33/08 | (2006.01) |
| F21V 17/10 | (2006.01) |
| F21V 7/00 | (2006.01) |
| F21Y 115/10 | (2016.01) |

(52) U.S. Cl.
CPC ................ A45D 29/00 (2013.01); F21V 7/00 (2013.01); F21V 17/105 (2013.01); G02B 6/0001 (2013.01); H05B 33/0845 (2013.01); H05B 33/0857 (2013.01); H05B 37/0227 (2013.01); H05B 37/0281 (2013.01); *F21Y 2115/10* (2016.08)

(58) Field of Classification Search
CPC .......... F21V 7/00; F21V 23/009; F21V 23/04; F21V 29/61; F26B 3/28; F26B 9/00; G21K 5/08; F21L 14/00; F21L 4/08; A45D 29/00; A45D 29/001; A45D 29/22; A45D 44/005
See application file for complete search history.

(56) References Cited

U.S. PATENT DOCUMENTS

| | | | | |
|---|---|---|---|---|
| 2006/0045323 | A1* | 3/2006 | Ateya | G06K 9/2027 382/141 |
| 2008/0272936 | A1* | 11/2008 | Kim | G08G 1/095 340/929 |
| 2011/0112405 | A1* | 5/2011 | Barthe | A45D 44/005 600/459 |
| 2011/0277338 | A1* | 11/2011 | Li | F26B 3/28 34/275 |

(Continued)

*Primary Examiner* — Alexander H Taningco
*Assistant Examiner* — Seokjin Kim
(74) *Attorney, Agent, or Firm* — Muncy, Geissler, Olds & Lowe, P.C.

(57) ABSTRACT

A light curing device includes a plurality of LEDs, a driver, a switch module and a timer. The timer includes a plurality of time-setting buttons corresponding to different timing configurations, respectively. When the timer is activated by the switch module and one of the time-setting buttons is operated, the timer outputs an activating signal, and outputs a deactivating signal when a time duration defined by the corresponding timing configuration has elapsed. The driver drives at least one of the LEDs to emit curing light into an irradiation space in a housing module when triggered by the activating signal, and stops driving the LEDs to emit the curing light when triggered by the deactivating signal.

10 Claims, 6 Drawing Sheets

(56) References Cited

U.S. PATENT DOCUMENTS

| | | | | |
|---|---|---|---|---|
| 2013/0313445 | A1* | 11/2013 | Watson | A45D 29/00 |
| | | | | 250/492.1 |
| 2014/0042341 | A1* | 2/2014 | Park | B05D 3/067 |
| | | | | 250/492.1 |
| 2014/0266760 | A1* | 9/2014 | Burke, Jr. | G06F 19/3462 |
| | | | | 340/687 |
| 2015/0082654 | A1* | 3/2015 | Jaegal | A45D 29/00 |
| | | | | 34/275 |

* cited by examiner

LIGHT CURING DEVICE

CROSS-REFERENCE TO RELATED APPLICATION

This application claims priority of Taiwanese Patent Application No. 104217716, filed on Nov. 5, 2015.

FIELD

The disclosure relates to a light curing device, and more particularly to a light curing device capable of indicating a current operation status.

BACKGROUND

A conventional light curing device is adapted to emit light on a hand or foot of a user applied with a light curable product, such as gel nail polish. The conventional light curing device however lacks an indicator for showing duration of the light curing process or state of the conventional light curing device, such as whether or not the device is activated. Thus, the user cannot be informed clearly of a current operation status of the conventional light curing device.

SUMMARY

Therefore, an object of the disclosure is to provide a light curing device that can alleviate at least one of the drawbacks of the prior art.

According to the disclosure, the light curing device includes a housing module and a lighting module.

The housing module defines an irradiation space.

The lighting module is disposed at the housing module, and includes a plurality of light-emitting diodes (LEDs), a driver, a switch module and a timer.

The LEDs are configured to be driven to emit curing light into the irradiation space.

The driver is electrically connected to the LEDs for driving the LEDs.

The switch module is operable to activate the driver when triggered by an object placed in the irradiation space.

The timer is electrically connected to the switch module and the driver, has a plurality of timing configurations that respectively define different time durations, and includes a plurality of time-setting buttons that are disposed on and exposed from the housing module and that correspond to the timing configurations, respectively.

When the timer is activated by the switch module and a selected one of the time-setting buttons is operated, the timer is operable to output an activating signal, and to output a deactivating signal when one of the time durations defined by a corresponding one of the timing configurations that corresponds to the selected one of the time-setting buttons has elapsed.

The driver is configured to drive at least one of the LEDs to emit the curing light when triggered by the activating signal, and to stop driving the LEDs to emit the curing light when triggered by the deactivating signal.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
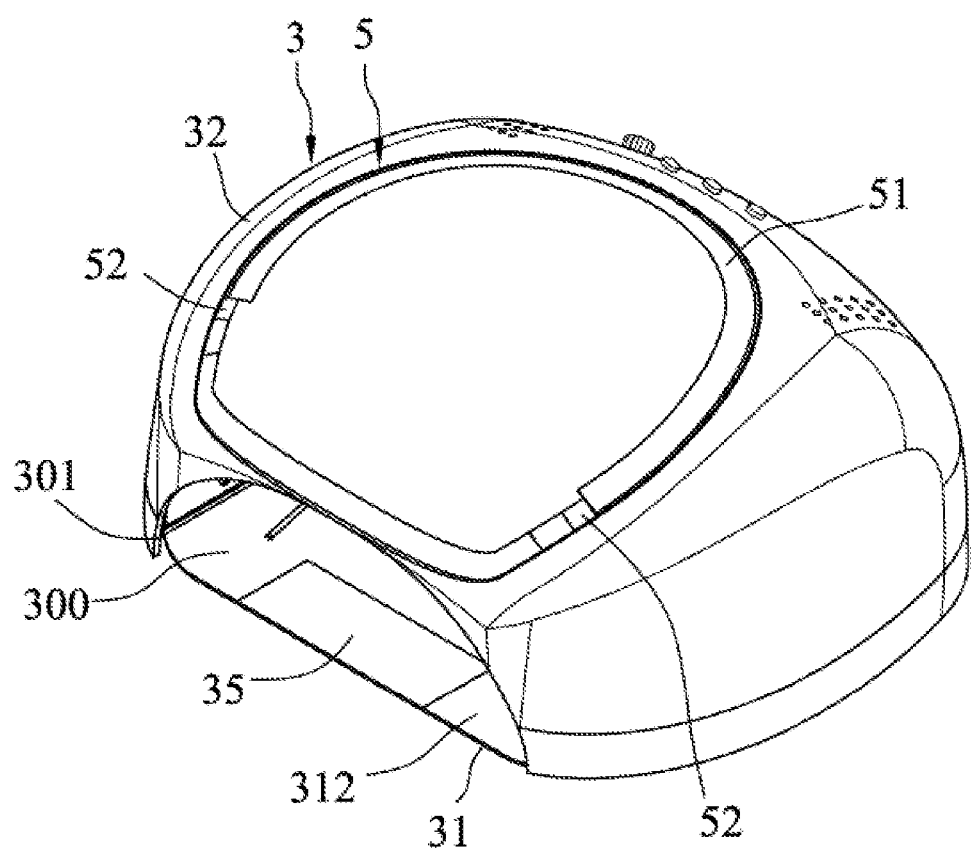
FIG. 1 is a perspective view of a first embodiment of a light curing device according to the disclosure.
Figure 2:
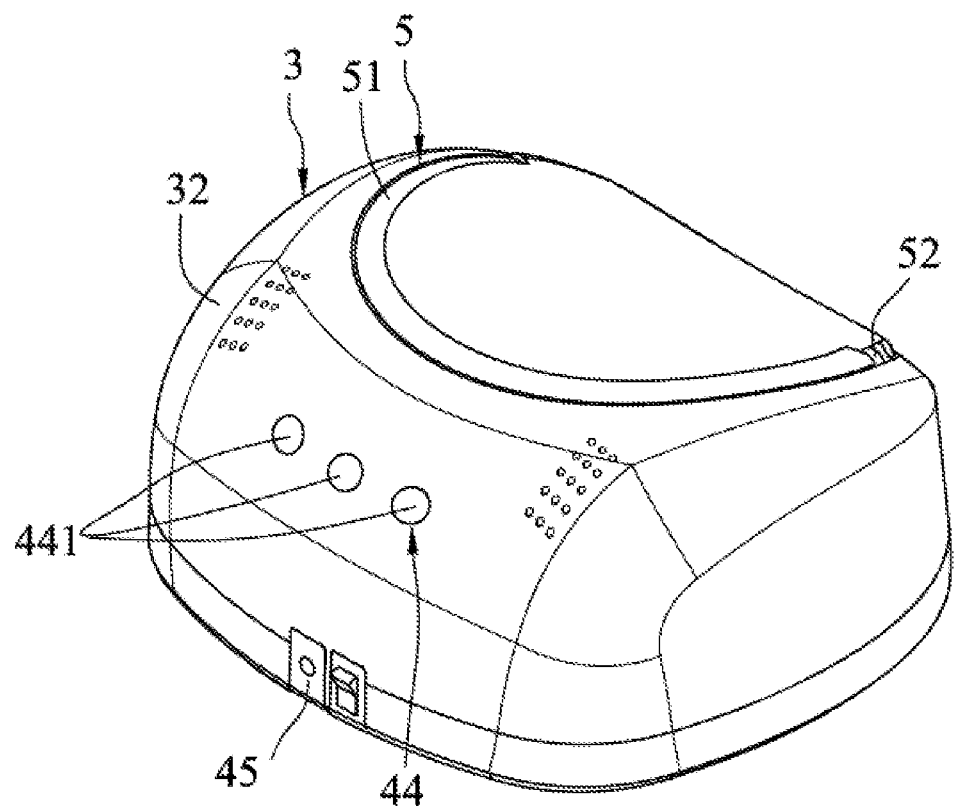
FIG. 2 is a perspective view of the first embodiment of the light curing device according to the disclosure from another viewpoint.
Figure 3:
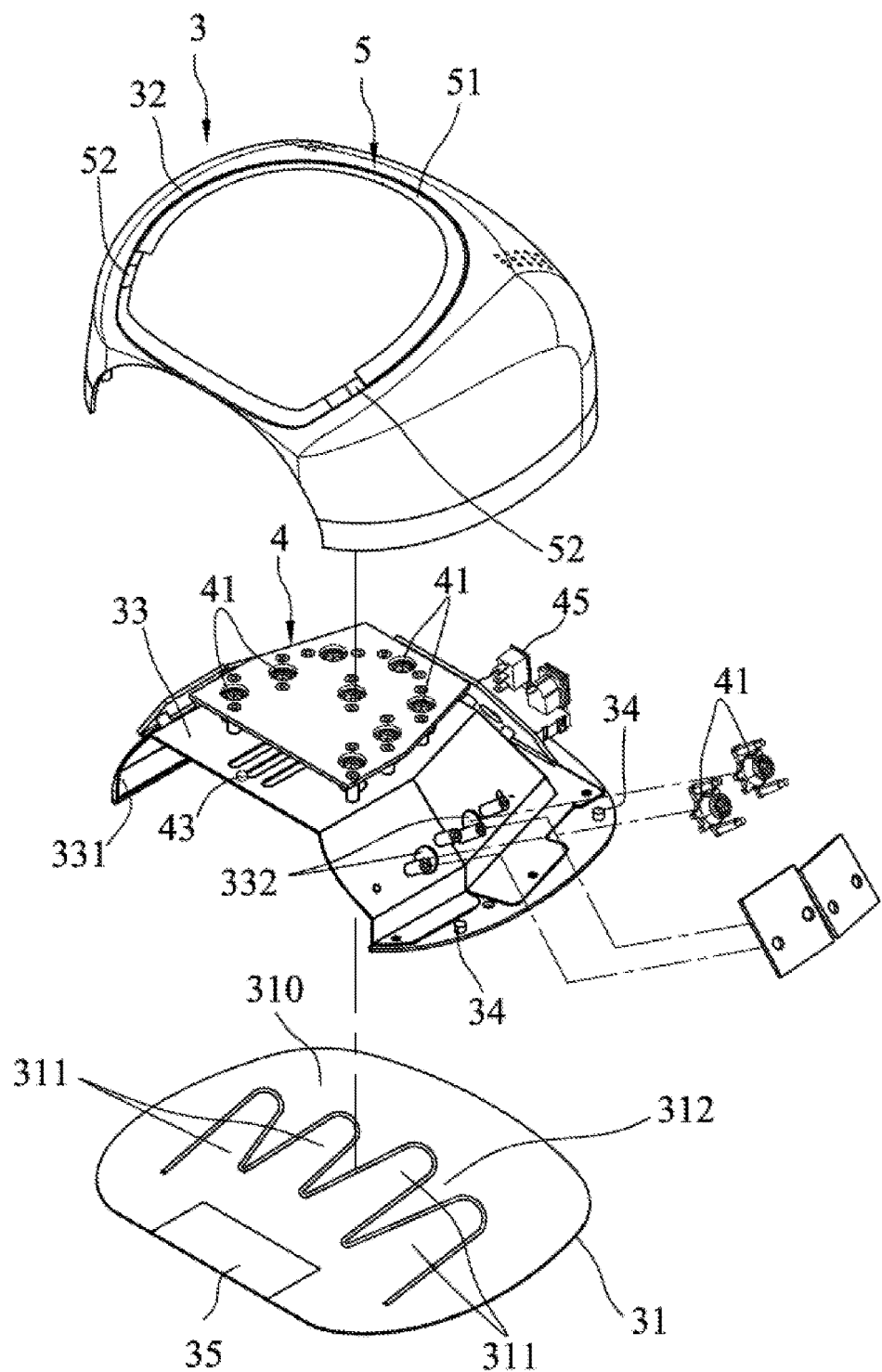
FIG. 3 is an exploded perspective view of the first embodiment of the light curing device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 5, the first embodiment of a light curing device according to this disclosure is described below. The light curing device includes a housing module 3, a lighting module 4 and an indicator module 5.

The housing module 3 includes a base plate 31, an outer cover 32, an inner cover 33, and a plurality of magnetic members 34 disposed at the inner cover 33 for interconnecting the inner cover 33 and the base plate 31. The outer cover 32 covers the inner cover 33 and the base plate 31 separably, is coupled to the base plate 31 separably, and cooperates with the inner cover 33 and the base plate 31 to define an irradiation space 300 and an opening 301. The opening 301 is in spatial communication with the irradiation space 300, and is configured to permit insertion of an object (e.g., a user's hand or foot) therethrough into the irradiation space 300. The base plate 31 is formed with a plurality of grooves 311 for positioning of fingers or toes of the user. In this embodiment, the grooves 311 are substantially finger-shaped. The user can insert his/her hand into the irradiation space 300 with the fingers positioned about the grooves 311. The base plate 31 has a top surface 310. The top surface 310 has a reflective zone 312 surrounding the grooves 311 and capable of reflecting curing light emitted by the lighting module 4. The inner cover 33 is formed with a plurality of mounting holes 332, and has an inner reflective surface 331 that faces the base plate 31 and that is capable of reflecting the curing light. The top surface 310 further has an anti-reflecting zone that does not reflect light. In an embodiment, the housing module 3 further includes an anti-reflecting membrane 35 attached to the top surface 310 of the base plate 31 for serving as the anti-reflecting zone. As illustrated in FIG. 1, the anti-reflecting membrane 35 is disposed near the opening 301, and significantly reduces the reflection of the curing light.

Referring to FIGS. 2 to 5, the lighting module 4 is disposed at the housing module 3 between the outer cover 32 and the inner cover 33, and includes a plurality of light-emitting diodes (LEDs) 41, a driver 42, a switch module 43, a timer 44 and a power terminal 45.

The LEDs 41 are configured to emit the curing light into the irradiation space 300. In particular, the LEDs 41 are disposed respectively in the mounting holes 332 in the inner cover 33. In this embodiment, the curing light emitted by the LEDs 41 is ultraviolet light.

The switch module 43 is operable to activate the driver 42 when triggered by the object placed in the irradiation space 300. In this embodiment, the switch module 43 is a reflective optical sensor module including an optical emitter 432 and an optical sensor 431 that are arranged side by side. The optical emitter 432 is electrically connected to the driver 42, and is configured to emit sensing light toward a predetermined area within the irradiation space 300. The optical sensor 431 is capable of sensing reflected sensing light, which is the sensing light reflected by and due to presence of the object at the predetermined area within the irradiation space 300. The optical sensor 431 is also configured to activate the driver 42 and the timer 44 whenever the reflected sensing light is sensed thereby. In this embodiment, the switch module 43 is disposed at the inner cover 33, is exposed in the irradiation space 300, and is positioned above the anti-reflecting membrane 35. Essentially, the anti-reflecting membrane 35 serves as the predetermined area, and the switch module 43 emits the sensing light towards the anti-reflecting membrane 35. In the absence of the object, the switch module 43 will not receive reflected sensing light, so the switch module 43 is not triggered. When the object, such as the user's hand, is placed on the anti-reflecting membrane 35 and reflects the sensing light, the switch module 43 will receive the reflected sensing light and is triggered to activate the driver 42 and the timer 44.

The timer 44 is electrically connected to the switch module 43 and the driver 42, and has a plurality of timing configurations defining different time durations (e.g., 10 seconds, 20 seconds, or 30 seconds), respectively. The timer 44 includes a plurality of time-setting buttons 441 disposed on and exposed from an outer surface of the outer cover 32 and corresponding to the timing configurations, respectively. When the timer 44 is activated by the switch module 43 and a selected one of the time-setting buttons 441 is operated, the timer 44 is operable to start timing one of the time durations defined by a corresponding one of the timing configurations that corresponds to the selected one of the time-setting buttons 441, and to output an activating signal. Then, the timer 44 is further operable to output a deactivating signal while the one of the time durations has elapsed.

The driver 42 is electrically connected to the LEDs 41, the switch module 43 and the timer 44. When the driver 42 is activated, the driver 42 is operable to drive the LEDs 41 to emit the curing light while the driver is triggered by the activating signal. The driver 42 is further operable to stop driving the LEDs 41 to emit the curing light when triggered by the deactivating signal.

The indicator module 5 is coupled to the lighting module 4, and includes a light guide 51, two indicating light sources 52 and an indicator controller 53. The light guide 51 is made of material that can guide light, and is exposed from the outer surface of the outer cover 32. The indicating light sources 52 are configured to emit indicating light toward the light guide 51, such that the indicating light can be seen from outside of the housing module 3. The indicator controller 53 is activated and driven by the switch module 43 to emit the indicating light with a specific color to indicate a stand-by state of the light curing device. When activated, the indicator controller 53 is triggered by the activating signal from the timer 44 to control and drive the indicating light sources 52 to emit the indicating light having different colors respectively corresponding to the time durations, and is further triggered by the deactivating signal from the timer 44 to stop the indicating light sources 52 from emitting the indicating light. It should be noted that the color of the indicating light is used to indicate which one of the timing configurations is in operation.

In this embodiment, the driver 42, the timer 44 and the indicator controller 53 are integrated into a circuit board 600.

Figure 4:
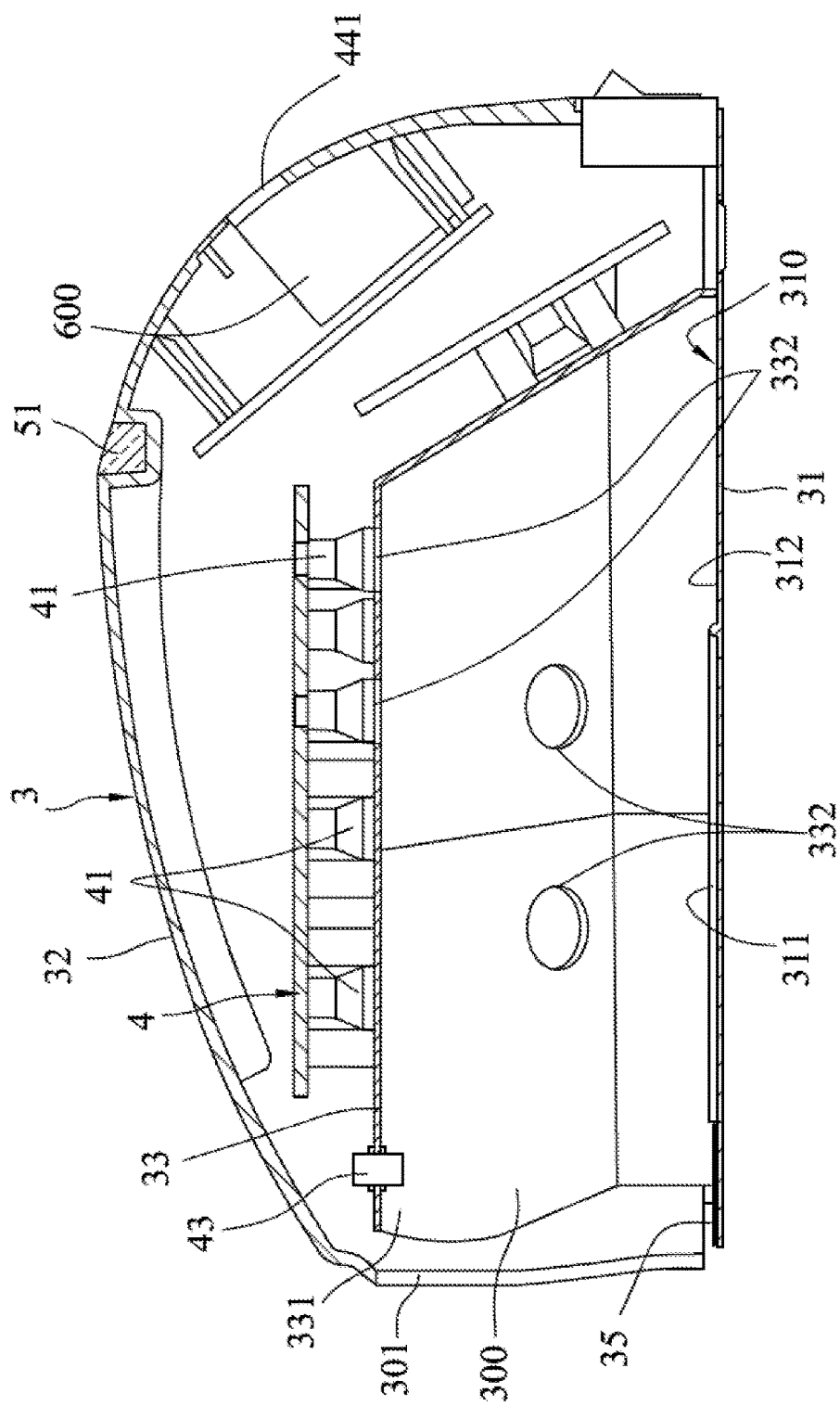
FIG. 4 is a cross-sectional view of the first embodiment of the light curing device according to the disclosure.
Figure 5:
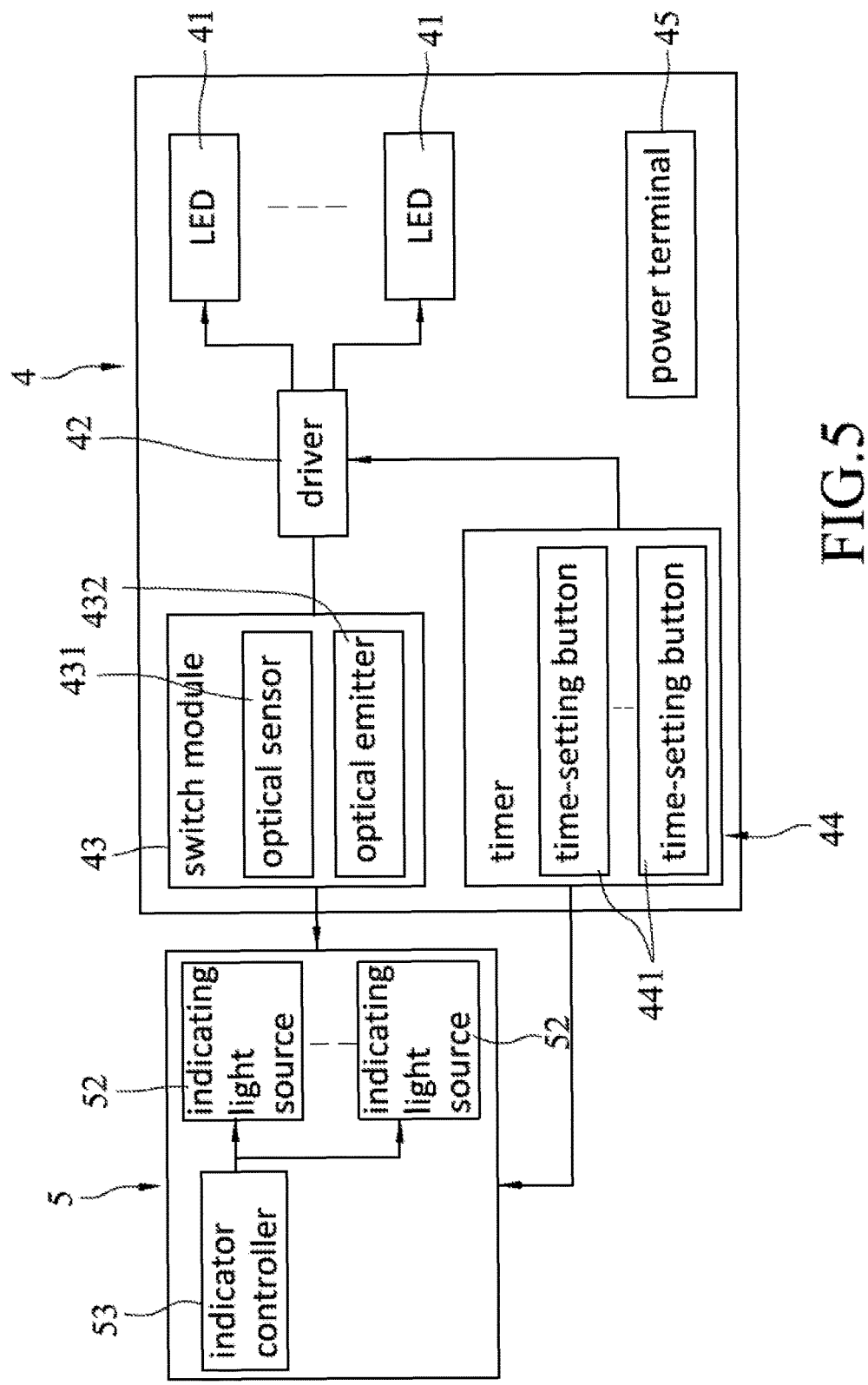
FIG. 5 is a block diagram for illustrating electronic components of the first embodiment of the light curing device according to the disclosure.

Referring to FIGS. 1, 4, and 5, as an example, for gel nail polish curing purposes, the user inserts his/her fingers or toes applied with gel nail polish into the irradiation space 300 through the opening 301 and places the fingers or toes about the grooves 311. At this time the switch module 43 senses the reflected sensing light reflected by the user's hand or foot, and activates the driver 42, the timer 44 and the indicator module 5 to operate. At this time, the light guide 51 of the indicator module 5 emits the indicating light with the specific color to indicate that the light curing device is in the stand-by state.

Then, the user can select and operate one of the time-setting buttons 441 to select one of the time durations of curing process of the gel nail polish. At this time, the timer 44 outputs the activating signal to activate the driver to drive the LEDs 41 to emit the curing light. Before the selected one of the time durations has elapsed, the user may freely remove the fingers or toes from the irradiation space 300, such that the switch module 43 is not triggered and disables the driver 42 so as to cease the emission of the curing light by the LEDs 41.

In addition, once the selected one of the time durations has elapsed, the deactivating signal is outputted to trigger the driver 42 to stop driving the LEDs 41 to emit the curing light.

It should be noted that, since the reflective surface 331 of the inner cover 33 and the reflective zone 312 on the top surface 310 of the base plate 31 both can reflect light, the curing light emitted by the lighting module 4 is irradiated evenly in the irradiation space 300.

In this embodiment, the timer 44 includes three time-setting buttons 441 corresponding respectively to three timing configurations, and the indicator module 5 can emit the indicating light with four different colors to respectively indicate the stand-by state and the timing configurations. In one embodiment, each of the time durations is divided into a plurality of successive periods, and the timer 44 is operable to output timing signals respectively at the periods, and the indicator controller 53 is not only configured to be triggered by the activating signal but also to be triggered by the timing signals to gradually adjust brightness of the indicating light emitted by the indicating light sources 52, such as to make the indicating light gradually brighten or gradually fade, for indicating progress of the curing process of the gel nail polish.

In one embodiment, the indicator controller 53 is triggered sequentially by the timing signals from the timer 44 so as to control and drive the indicating light source 52 to emit the indicating light with different colors respectively at the periods for indicating the progress of the curing process.

In one embodiment, the indicator module 5 includes a plurality of the light guides 51 and a plurality of the indicating light sources 52. A number of the light guides 51 and a number of the indicating light sources 52 are equal to a number of the periods of each of the time durations. The indicator controller 53 is triggered sequentially by the timing signals from the timer 44 so as to control and drive the indicating light sources 52 to start emitting the indicating light one by one. Alternatively, the indicator controller 53 drives all the indicating light sources 52 to start emitting the indicating light at a beginning of the time duration, and is triggered sequentially by the timing signals to disable the indicating light sources 52 one by one.

It should be noted that, since the base plate 31 is separable from the inner cover 33, in use, the user may choose to place the fingers or toes on a surface (such as a tabletop), separate the base plate 31 from the light curing device, and cover the fingers or toes with the remainder of the light curing device. Alternatively, the user may place his/her hand or foot on the base plate 31 first, and then assemble the remainder of the light curing device with the base plate 31.

Figure 6:
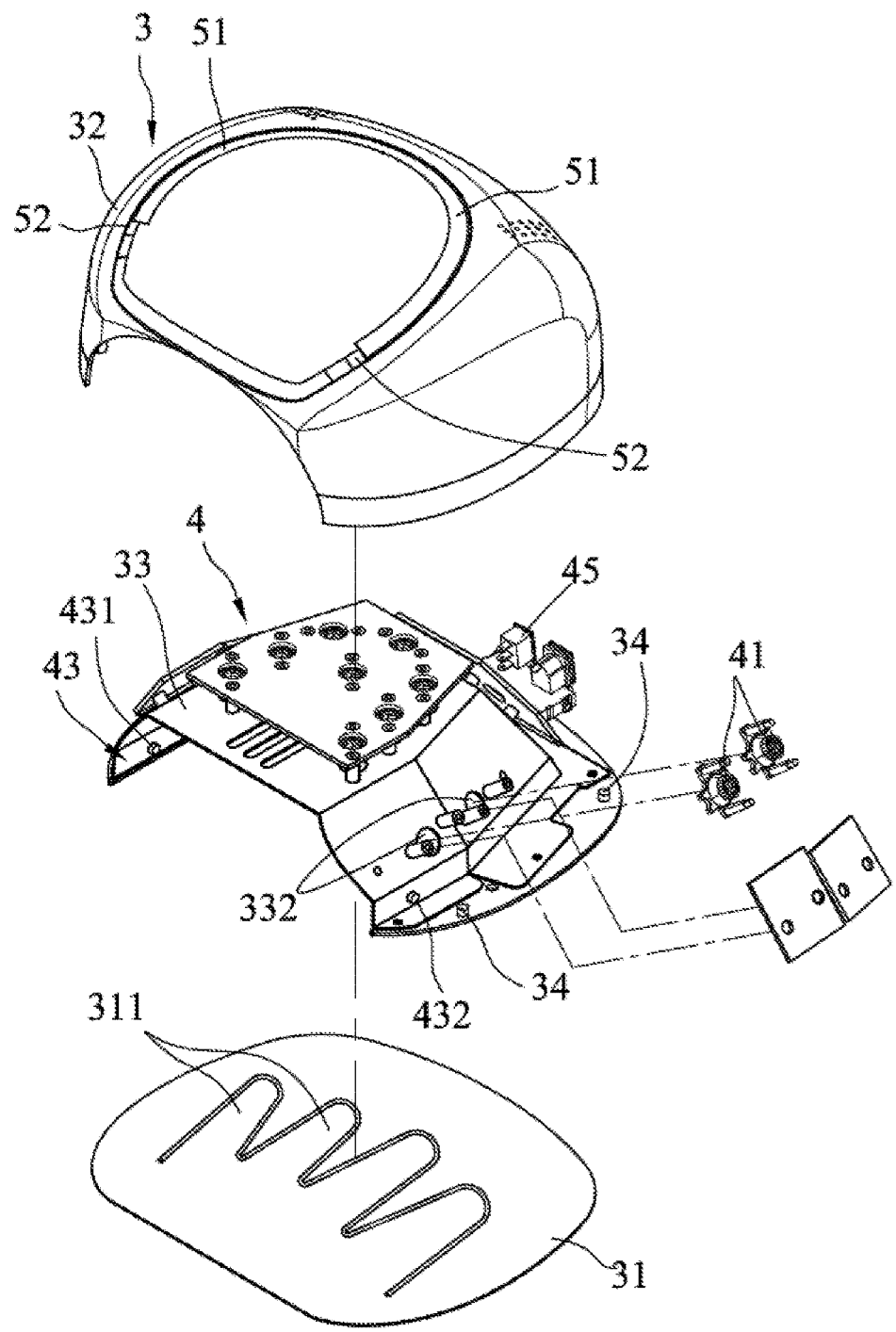
FIG. 6 is an exploded perspective view of a second embodiment of a light curing device according to the disclosure.

Referring to FIGS. 5 and 6, a second embodiment of a light curing device according to this disclosure is described below. The second embodiment differs from the first embodiment mainly in the switch module 43. The switch module 43 is an optical sensor module, and includes an optical emitter 432 and an optical sensor 431. The optical emitter 432 is configured to emit the sensing light, and the optical sensor 431 is configured to receive the sensing light from the optical emitter 432 and to activate the driver 42 whenever not receiving the sensing light. The optical emitter 432 and the optical sensor 431 are respectively disposed on left and right sides of the inner cover 33, and the optical emitter 432 is configured to continuously emit the sensing light toward the optical sensor 431. When the object in the irradiation space 300 between the optical sensor 431 and the optical emitter 432 blocks the sensing light, the optical sensor 431 does not receive the sensing light, and the switch module 43 is triggered and activates the driver 42, the timer 44 and the indicator module 5.

In one embodiment, the switch module 43 is a microswitch that is configured to be triggered upon being touched by the object in the irradiation space 300, and to activate the driver 42 whenever the microswitch is triggered. The description of the other similar structure and operation will be omitted for the sake of brevity.

In one embodiment, the switch module 43 is mounted co-movably to the base plate 31 and has a first terminal (not shown) fixed at the base plate 31, and the lighting module 4 has a second terminal (not shown) disposed at the outer cover 32 or the inner cover 33 and configured to be electrically and separably connected to the first terminal so as to electrically connect the switch module 43 to the driver 42 of the lighting module 4. Similarly, in one embodiment, the optical sensor 431 and the optical emitter 432 are mounted respectively co-movably to the base plate 31 and the inner cover 33, and are configured to be electrically and separably connected to the first terminal and the second terminal so as to electrically connect the switch module 43 to the driver 42 of the lighting module 4.

In summary, the color of the indicating light emitted by the indicator module 5 can indicate the stand-by state and/or the timing configurations, so the user can be informed clearly of operation status of the light curing device according to this disclosure.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A light curing device comprising:
   a housing module including a base plate, an anti-reflecting membrane attached to a top surface of said base plate, an inner cover disposed on said base plate and having an inner reflective surface that faces said base plate, and an outer cover covering said inner cover and said base plate and cooperating with said inner cover and said base plate to define an irradiation space and an opening that is in spatial communication with the irradiation space and that is configured to permit insertion of an object therethrough into the irradiation space;
   a lighting module disposed at said housing module, and including:
      a plurality of light-emitting diodes (LEDs) that are configured to be driven to emit curing light into the irradiation space, said inner reflective surface of said inner cover being configured for reflecting the curing light,
      a driver electrically connected to said LEDs for driving said LEDs to emit the curing light,
   a switch module disposed on said inner cover, and including an optical emitter that is electrically connected to said driver and that is configured to emit sensing light toward said anti-reflecting membrane, and an optical sensor that is capable of sensing reflected sensing light, which is the sensing light reflected by and due to presence of the object placed in the irradiation space, and that is operable to activate said driver whenever the reflected sensing light is sensed thereby, and
   a timer electrically connected to said switch module and said driver, having a plurality of timing configurations that respectively define different time durations, and including a plurality of time-setting buttons that are disposed on and exposed from said housing module and that correspond respectively to the timing configurations, each of the time durations being divided into a plurality of successive periods; and
   an indicator module coupled to said lighting module, and including:
      a light guide that is exposed from said housing module,
      an indicating light source that is configured to emit indicating light toward said light guide, and
      an indicator controller that is configured to be triggered by the activating signal from said timer, and to control and drive said indicating light source to emit the indicating light having different colors respectively corresponding to the time durations,
   wherein, when said timer is activated by said switch module and a selected one of said time-setting buttons is operated, said timer is operable to output an activating signal, and to output a deactivating signal when one of the time durations defined by a corresponding one of the timing configurations that corresponds to the selected one of said time-setting buttons has elapsed,
   wherein said driver is configured to drive at least one of said LEDs to emit the curing light when triggered by the activating signal, and to stop driving said LEDs to emit the curing light when triggered by the deactivating signal, and wherein said timer is further operable to output timing signals respectively at the periods, and said indicator controller is further configured to be triggered sequentially by the timing signals from said timer so as to control and drive said indicating light source to emit the indicating light with different colors at the successive periods, respectively.

2. The light curing device as claimed in claim 1, wherein, when triggered by the object placed in the irradiation space, said switch module is further operable to activate said indicator controller to control and drive said indicating light source to emit the indicating light with a specific color to indicate a stand-by state of said light curing device.

3. The light curing device as claimed in claim 1, wherein said indicator module includes a plurality of said light guides, and a plurality of said indicating light sources configured to emit indicating lights toward said light guides, respectively, wherein said indicator controller is triggered sequentially by the timing signals from said timer so as to control and drive said indicating light sources to emit the indicating light one by one.

4. The light curing device as claimed in claim 1, wherein the object is one of a hand and a foot, and said base plate is formed with a plurality of grooves for positioning of fingers or toes.

5. The light curing device as claimed in claim 1, wherein said outer cover is coupled to said base plate separably, and said housing module further includes at least one magnetic member disposed on said inner cover for interconnecting said inner cover and said base plate.

6. A light curing device comprising:

a housing module including a base plate, an anti-reflecting membrane attached to a top surface of said base plate, an inner cover disposed on said base plate and having an inner reflective surface that faces said base plate, and an outer cover covering said inner cover and said base plate and cooperating with said inner cover and said base plate to define an irradiation space and an opening that is in spatial communication with the irradiation space and that is configured to permit insertion of an object therethrough into the irradiation space;

a lighting module disposed at said housing module, and including:

a plurality of light-emitting diodes (LEDs) that are configured to be driven to emit curing light into the irradiation space, said inner reflective surface of said inner cover being configured for reflecting the curing light, a driver electrically connected to said LEDs for driving said LEDs, a switch module disposed on said inner cover, and including an optical emitter that is electrically connected to said driver and that is configured to emit sensing light toward said anti-reflecting membrane, and an optical sensor that is capable of sensing reflected sensing light, which is the sensing light reflected by and due to presence of the object placed in the irradiation space, and that is operable to activate said driver whenever the reflected sensing light is sensed thereby, and a timer electrically connected to said switch module and said driver, having a plurality of timing configurations that respectively define different time durations, and including a plurality of time-setting buttons that are disposed on and exposed from said housing module and that correspond respectively to the timing configurations, each of the time durations being divided into a plurality of successive periods; and an indicator module coupled to said lighting module, and including:

a light guide that is exposed from said housing module, an indicating light source that is configured to emit indicating light toward said light guide, and an indicator controller that is configured to be triggered by the activating signal from said timer, and to control and drive said indicating light source to emit the indicating light having different colors respectively corresponding to the time durations, wherein, when said timer is activated by said switch module and a selected one of said time-setting buttons is operated, said timer is operable to output an activating signal, and to output a deactivating signal when one of the time durations defined by a corresponding one of the timing configurations that corresponds to the selected one of said time-setting buttons has elapsed, wherein said driver is configured to drive at least one of said LEDs to emit the curing light when triggered by the activating signal, and to stop driving said LEDs to emit the curing light when triggered by the deactivating signal, and wherein said timer is further operable to output timing signals respectively at the periods, and said indicator controller is further configured to be triggered sequentially by the timing signals from said timer so as to gradually adjust brightness of the indicating light emitted by said indicating light source.

7. The light curing device as claimed in claim 6, wherein, when triggered by the object placed in the irradiation space, said switch module is further operable to activate said indicator controller to control and drive said indicating light source to emit the indicating light with a specific color to indicate a stand-by state of said light curing device.

8. The light curing device as claimed in claim 6, wherein said indicator module includes a plurality of said light guides, and a plurality of said indicating light sources configured to emit indicating lights toward said light guides, respectively, and wherein said indicator controller is triggered sequentially by the timing signals from said timer so as to control and drive said indicating light sources to emit the indicating light one by one.

9. The light curing device as claimed in claim 6, wherein the object is one of a hand and a foot, and said base plate is formed with a plurality of grooves for positioning of fingers or toes.

10. The light curing device as claimed in claim 6, wherein said cover is coupled to said base plate separably, and said housing module further includes at least one magnetic member disposed on said cover for interconnecting said cover and said base plate.

* * * * *